Figure 1:
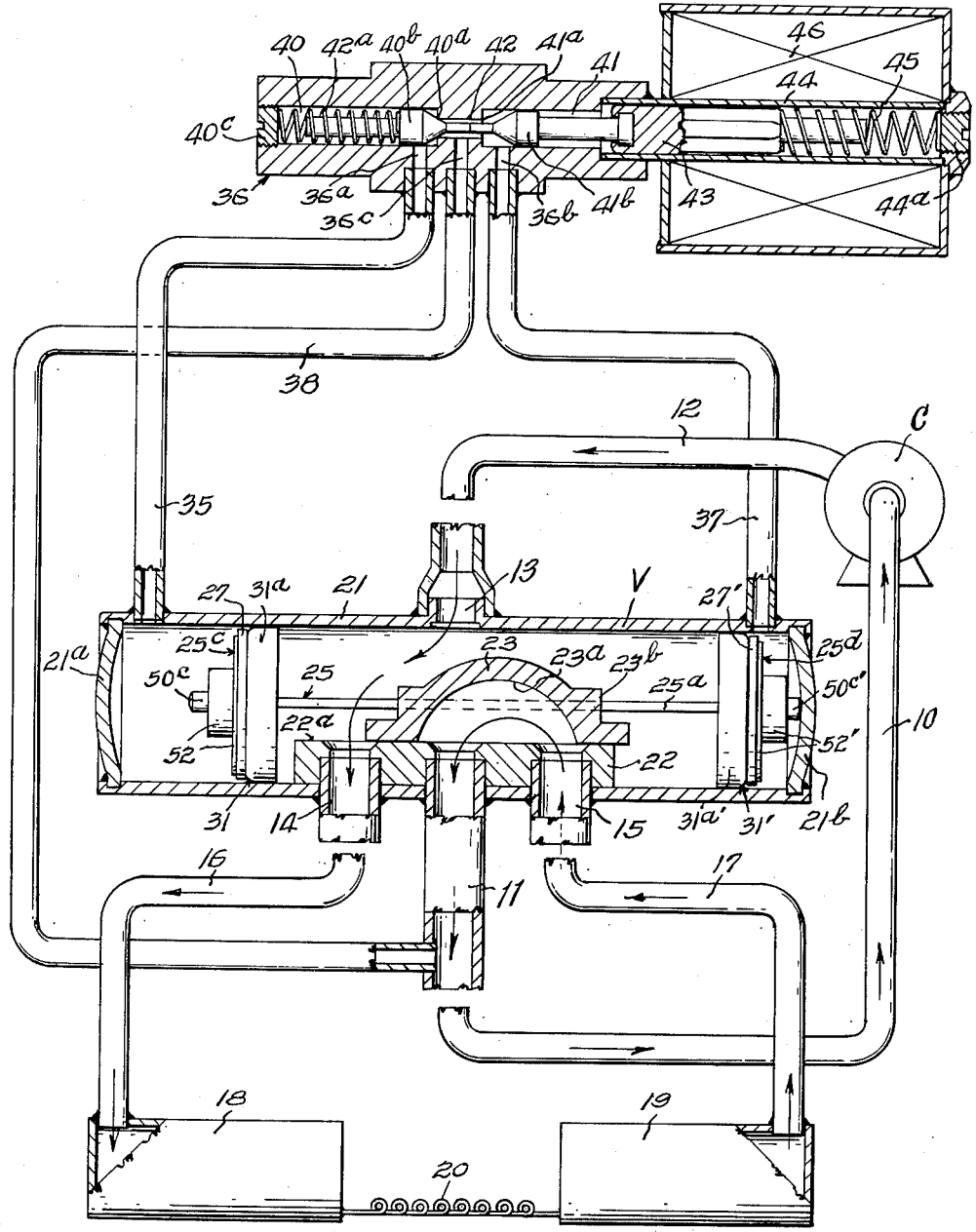

INVENTOR:
FREDERICK A. GREENAWALT.
BY
ATTORNEY.

United States Patent Office 3,056,574
Patented Oct. 2, 1962

3,056,574
VALVE MECHANISM
Frederick A. Greenawalt, Fort Lauderdale, Fla., assignor to Ranco Incorporated, Columbus, Ohio, a corporation of Ohio
Filed Aug. 25, 1959, Ser. No. 835,921
9 Claims. (Cl. 251—31)

The present invention relates to a valve mechanism having a valve shifting piston which is driven by pressure differential of fluid in the system in which the valve mechanism is installed according to operation of a relatively low powered pilot valve handling a relatively light flow of fluid.

Valve mechanisms of the general type mentioned are known and each comprises a main valve member which is shifted between alternate control positions by means including a cylinder having a reciprocable, double ended piston therein connected to the valve member and which separates the cylinder into a central and two outer sections, the central section being connected at all times with the high pressure side of the fluid system in which the valve is installed, and the two outer sections are connected by individual bleed passages or lines to an exhaust, such as the low side of the system, and each bleed line is controlled by a pilot valve. Restricted flow passages of less capacity than the individual bleed lines are provided from the central section of the cylinder to the respective outer sections to permit the pistons to be withdrawn from the outer sections of the cylinder when the opposite outer section is bled to exhaust. Since the flow capacity of the respective restricted passages is appreciably less than the flow capacity of the bleed lines, when one pilot valve is operated to open its bleed line the pressure in the section of the cylinder to which the open bleed line is connected falls below that in the central section which results in the piston being driven into the bled section and in so doing shifts the main valve member. One problem encountered heretofore by the use of the type of valve structure described is that in many instances it is inconvenient to reclose the bleed line after the piston has shifted from one end of its stroke to the other as a result of the opening of the line, and consequently fluid continually escapes to exhaust through the restricted passage and open bleed line. This escape of fluid is undesirable in many instances.

The principal object of the present invention is the provision of a valve mechanism of the type mentioned in which the restricted passage is closed by valve means actuated as the piston approaches one end of its valve shifting stroke whereby the flow of fluid to the exhausted section of the cylinder is foreclosed.

A further object of the invention is the provision of a valve mechanism of the type mentioned in which the restricted passage includes an opening in which a pin-like member reciprocates longitudinally relative to the opening walls by shifting of the piston to thereby maintain the passage free of clogging by foreign matter.

A further object of the invention is the provision of restricted passages through the piston heads, each of which passages have a reciprocable member therein which is shifted relative to the passage walls to prevent clogging of the passages by foreign matter which might otherwise collect and obstruct flow through the passages. Preferably, the reciprocable members are pin-like elements shifted longitudinally relative to the passages in which they extend by movement of the piston relative to an adjacent end of the cylinder in which the piston reciprocates.

Still a further object of the invention is the provision of a valve mechanism of the type mentioned in which the piston comprises two spaced interconnected heads each having a fluid passage therethrough, a valve member carried by each head and arranged to be forced into a seat at the outer opening of the restricted passage by engaging a stop toward which the piston head is urged. In a preferred form of the invention, the valve member has a projecting part which extends into the passage adapted to be closed thereby to provide a restriction in the passage and to maintain the passage clear of foreign matter by relative reciprocating of the valve member relative to the piston head.

The invention further contemplates a seal and valve seat structure for the piston heads which effectively prevents leakage of fluid between the piston edges and the cylinder walls and through the valve seat element.

Figure 2:
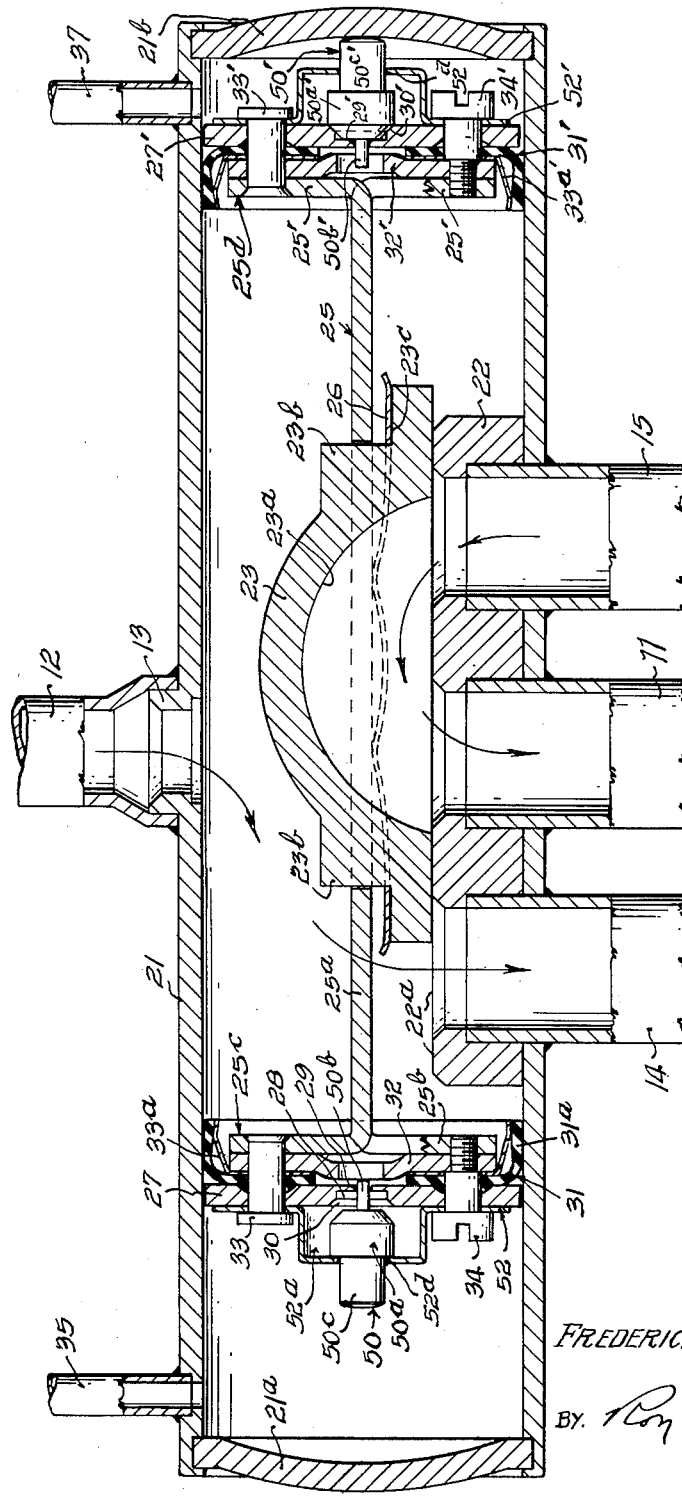

Other objects and advantages of the invention will be apparent from the following description of a preferred form thereof, reference being made to the accompanying drawings wherein FIG. 1 is a schematic view of a refrigerating system having a refrigerant flow reversing valve therein embodying the invention, the valve being shown in section, and FIG. 2 is a view of the valve shown in FIG. 1, but on a larger scale and showing certain other parts broken away or in section.

The valve may be used in various fluid flow systems, and it has particular utility in a reversing valve mechanism connected in a refrigerating system so that the order of flow of refrigerant through the heat exchangers of the system can be reversed to cause one of the exchangers to serve selectively as a refrigerant condenser or as an evaporator and thereby either heat or cool a medium in heat exchange with the exchanger. In the form shown, the refrigerating system comprises a suitably powered refrigerant compressor C which has its intake connected by conduit 10 with the outlet port 11 of a reversing valve indicated generally at V, and the discharge of the compressor is connected by a conduit 12 to the intake port 13 of the valve. The valve includes reverse flow ports 14 and 15 which are connected by tubes 16 and 17 to one end, respectively, of heat exchangers 18 and 19 which are connected at the other ends thereof by a restrictor flow member 20 so as to maintain a pressure differential of refrigerant between the exchangers. Both exchangers can function to either condense or evaporate refrigerant, and may be employed to heat or cool the air of a room, for example, by circulating outdoor air over exchanger 18 and room air over exchanger 19. Valve V functions to selectively direct the flow of fluid first through port 14, conduit 16, exchangers 18 and 19 and conduit 17, or in a reverse path. This type of refrigerating system is commonly known as a "reverse cycle system" and does not form a part of the present invention.

Valve V comprises a cylinder 21 having an extruded opening in the side at the central portion thereof which forms inlet port 13 to which tube 12 is brazed. The ends of the cylinder are closed by caps 21a and 21b secured in place by providing internal shoulders against which the caps engage and rolling the end portions of the cylinder against the peripheral edges of the caps. Preferably solder is flowed about the edges thereof to provide a gas-tight seal. The central portion of the cylinder has a port block 22 therein which provides a flat surface 22a on which a slide valve member 23 is adapted to reciprocate. Block 22 and the sides of the cylinder have three bored openings therethrough which provide a central outlet passage, in which a tube forming outlet port 11 is secured, and alternate flow passages in which tubes forming the reverse flow ports 14 and 15 are secured. Valve member 23 has a flat face which rides on face 22a, and a cavity 23a is formed therein which provides a connecting passage between the outlet port 11 and one or the other of reverse flow ports 14 or 15, depending upon the position of the valve member on block 22. Valve arrangements of this type are well known and the form shown is not necessarily essential to the invention.

Valve member 23 is adapted to be shifted to alternative flow control positions by a double headed piston structure 25 which comprises a connecting plate 25a having its ends split and turned in opposite direction to provide outturned lateral lugs 25b to which piston heads 25c and 25d are attached. The central portion of plate 25a is open to receive a rectangular block form 23b of valve member 23 by which the plate is operatively connected to the valve member for propelling and guiding the valve member in its sliding movement on block 22. Preferably, a spring plate 26 is interposed between the bottom side of plate 25a and a ledge 23c surrounding the valve member to maintain valve member in engagement with the face 22a.

Both piston heads 25c and 25d are identical in construction and to facilitate the description thereof only head 25c is described in detail, but reference characters referring to like parts on piston head 25d are indicated by like reference characters bearing a prime. Referring to FIG. 2, and specifically to piston head 25c, this head structure comprises a rigid disc 27 having a central passage 28 therethrough which is of relatively small diameter at 29 and which opens into an outwardly facing valve seat structure 30 of larger diameter. Disc 27 fits relatively loosely in cylinder 21 but a fluid-tight seal between the disc and the cylinder walls are provided by an annular seal member 31 pressed to the inner face of the disc by an annular backing plate 32 which is secured in tight clamping relation with the disc by two rivets 33 and two screws 34, only one of each appears in the drawings, and which are attached to lugs 25b. The peripheral portion of seal member 31 provides a skirt 31a which extends inwardly along the walls of cylinder 21 and is urged to the walls of the cylinder by an annular spring washer 33a interposed between seal 31 and backing plate 32. By the arrangement shown, the pressure of fluid in the section of the cylinder between the piston heads furthers the sealing action by urging the skirts against the cylinder walls. Preferably, the seal member is of a resilient material having a low friction factor, such as resin material tetrafluoroethylene, commercially known as "Teflon." As shown in the drawings, seal 31, plate 32 and spring member 33a have central openings aligned with passage 29 through disc 27 to provide a fluid passage through piston head 25c. It will be seen that piston heads 25c and 25d separate cylinder 21 into three sections or compartments connected by the central openings through the piston heads, and that the central section is at all times connected through inlet port 13 with the discharge of compressor C. This fluid pressure is utilized to drive the piston assembly in opposite directions in the cylinder by alternatively bleeding the opposite end sections or compartments to the low side of the system at a faster rate than the rate of flow through the central openings through the piston heads. This manner of driving the piston structure is old and well known in the art.

In the form of the invention shown, the left hand section of cylinder 21 is arranged to be connected to the low side of the refrigerating system through a bleed passage or line comprising a conduit 35 brazed in an opening in the side of the cylinder and which conduit leads to one inlet port 36a of a three-way pilot valve 36. The opposite outer section of cylinder 21 may be similarly connected by a conduit 37 to a second inlet port 36b of the three-way valve. The outlet port 36c of the three-way valve is connected by conduit 38 to the interior of outlet port 11 of valve V, which is in turn connected to the inlet or low pressure side of compressor C by conduit 10. The three-way valve employed may be of any suitable construction, and in the form shown, it comprises a cylindrical body bored to provide two inlet chambers 40, and 41 separated by an outlet chamber 42. Valve seats 40a and 41a in chambers 40 and 41 admit fluid from the inlet chambers to the outlet chamber and these seats are alternatively closed and opened by valve members 40b and 41b. Valve member 40b is biased to closed position by a coil spring 42a which reacts against a plug 40c threaded into the outer end of chamber 40, and valve member 41b is attached to a solenoid armature 43 located in a sleeve 44 of nonmagnetic material, such as brass, brazed into the open outer end of chamber 41, and which armature and valve are urged toward valve seat 41a by a spring 45 in the sleeve and reacting against a plug 44a closing the outer end of the sleeve. Valve members 40b and 41b have pin-like stems projecting through the valve seats and engaging the ends of one another for maintaining the valve members spaced so that when one member is on its seat the other is forced away from its seat and vice versa. Spring 45 has sufficient tension to overcome spring 42a and cause valve member 41b to close seat 41a and to move valve member 40b from its seat. A solenoid 46 surrounds sleeve 44 and when energized, the solenoid is operative to overcome the effect of spring 45 on valve 41b and move this valve from its seat 41a, whereupon valve 40b is urged to its seat 40a by spring 42a. It will be seen that when solenoid 46 is de-energized bleed line 35 is connected with the intake of the compressor through valve 36 and bleed line 37 is closed. When solenoid 46 is energized, bleed line 35 is closed and bleed line 37 is connected with the compressor intake. The circuit for solenoid 46 is not shown since any suitable control for the circuit may be employed. It will be appreciated, however, that at all times one or the other of the bleed lines is connected with the low pressure side of the refrigerating system.

The presser invention provides means to terminate the flow of fluid through the bleed lines following shifting movement of valve member 23 by the piston assembly, and accordingly the piston heads carry valve members 50 and 50' which are arranged to close seats 30 and 30' when the piston heads approach the end caps 21a and 21b, respectively.

In the form of the invention shown, valve member 50, which may be of any suitable material, such as stainless steel, is supported in alignment with valve seat 30 by a bracket 52 which comprises a disc having a central cup-shape recess 52a and which is attached to the outer face of disc 27 by rivets 33 and screws 34. Valve member 50 has a central portion of relatively large diameter and a tapered seat engaging end 50a from which a pin-like stem 50b projects axially therefrom and extends through relatively narrow passage 29. The opposite end of member 50 has a plunger portion 50c which extends through an opening 52d in bracket 52, which opening cannot accommodate the larger central portion of the valve member so that the valve member is slidingly held in alignment with seat 30 by stem 50b and plunger 50c supported in the walls of the openings 29 and 52b respectively. It is to be noted that stem 50b closes a major cross-section of opening 29 and that it is adapted to reciprocate in the opening when valve members 50 moves to and from seat 30, thereby freeing foreign matter which might tend to clog the opening. In forming the piston head, a relatively substantial size drill can be employed to bore opening 29, but the stem 50b in the opening reduces its effective cross-sectional area to a dimension which would be impractical to bore without considerable expense. When the piston assembly is driven to the left hand end of its stroke due to opening of bleed line 35, plunger 50c of valve member 50 engages cap 21a, thereby causing piston head 25c to move relative relative thereto and press valve seat 30 tightly against the tapered portion of the valve member, and effectively seal the restricted passage through the piston head. Since line 35 remains open to the low side of the system, the full pressure differential in the refrigerating system is present on opposite sides of piston head 25c and therefore considerable force is applied in seating valve 50 on seat 30 thereby assuring a tight, effective fluid seal.

Referring to the operation of the valve mechanism, assuming solenoid 46 is energized, as shown in FIG. 1, piston assembly 25a will be in the right hand position and the flow of refrigerant through the valve will be as indicated by the arrows. Upon de-energization of the solenoid, spring 45 urges valve member 41b onto valve seat 41a which causes valve member 40b to be removed from its seat 40a. By this action, the left hand section of cylinder 21 is connected by line 35, valve 36 to conduit 10 to the intake of the compressor so that the pressure on the left hand side of piston head corresponds to that on the low side of the system, whereas the pressure of the refrigerant in the central section of the cylinder will be relatively high since the discharge of compressor C is connected to the cylinder through the inlet port 13. The area of piston head 25c exposed to the pressure differential between the bled end of the cylinder and the central area thereof is substantially the entire face area of the piston head less the relatively insignificant area between the walls of bleed opening 29 and pin 50b, whereas the area of piston head 25d effected by this pressure differential is appreciably less because port 30' is closed by valve member 50c' which is lodged against end wall 21b of the cylinder which substantially reduces the area of the piston head affected by pressure. Thus, since conduit 37 is now closed at seat 41a the pressure tending to urge piston head 25d to cap 21b is reduced below that now urging head 25c toward the wall 21a and the lack of seating pressure between seat 30' and valve 50' permits leakage through seat 30' which quickly raises the pressure in the outer right-hand section of cylinder 21 to that of the central section. The reduction of pressure in the left hand end of cylinder 21 causes the pressure on the right hand side of piston head 25c to drive the piston assembly and valve member 23 to the left until plunger 50c engages cylinder cap 21a and causes closing of seat 30 as described hereinbefore. As piston head 25d travels toward the left, refrigerant passes through opening 29' and seat 30' and moves valve 50' outwardly from the seat. Valve member 23 has now been shifted to open port 15 to inlet 13 by way of the central section of the cylinder, and to connect port 14 with port 11 by way of cavity 23a. The valve parts will remain in this position until solenoid 46 is re-energized which closes line 35 and opens line 36 to the low side of the system, thereby equalizing the pressure on opposite end of the piston assembly which immediately releases the force tending to hold valve seat 30 to valve seat 50 which permits leakage of high pressure fluid into the left hand end section of cylinder 21 to cause piston head 25d to be driven by the differential in fluid pressure on opposite sides thereof to the right, moving valve 50' against cap 21b which terminates its travel so that seat 30' moves thereagainst to close off the flow of fluid therethrough.

It will be noted that pins 50b and 50b' on valve members 50 and 50', respectively, shift in their respective passages during shifting of the piston assembly and in doing so the passages are mechanically freed of any foreign matter which may tend to lodge therein, thus eliminating the possibility of the restricted passages becoming clogged. This is important in view of the fact that the flow through the piston heads must be restricted relative to bleed lines 35 and 36, and the arrangement of the pins reciprocating in the passage openings 29 and 29' provide easily formed restrictions which cannot become clogged. As mentioned previously, another advantage of the construction shown is the fact that the openings 29 and 29' can be bored by a durable drill of substantial diameter because the pins 50b and 50b' close a major portion of the cross sectional area of the openings and greatly reduce the effective cross-sectional area. Thus, the economical production of quite small, non-clogging passages is effected.

While but one form of the invention has been described, it is to be understood that other modifications and adaptations could be effected all of which fall within the scope of the claims which follow.

I claim:
1. A valve mechanism comprising in combination, a cylinder, a double head piston structure reciprocable through a given stroke in said cylinder and comprising two spaced piston heads arranged to divide the cylinder into three compartments, a valve member shiftable by movement of said piston structure, means to connect the central compartment in said cylinder with a source of fluid, means forming a bleed line from each of the outer compartments of said cylinder to an exhaust, valve means to control fluid flow through one or the other of said bleed lines to thereby create a pressure on one or the other of the outer faces of the piston heads lower than the pressure on the inner faces and thereby causes said piston structure to be urged toward the bled chamber, means forming restricted fluid flow passages from said central chamber of said cylinder to the outer of said chambers, respectively, said flow passages each having a relatively large valve seat thereabout, valve means carried by said piston heads and adapted to move to and from said valve seats to close and open said restricted passages to control the flow of fluid therethrough, and abutment means at the ends of said cylinder and engaged by the last mentioned valve means to move the latter to close on said valve seats by movement of said piston structure as said piston structure approaches an end of its valve member shifting movement toward the bled chamber to thereby close the restricted passage leading to the outer chamber connected with the open bleed line.

2. A valve mechanism comprising in combination, a cylinder, a double head piston structure reciprocable through a given stroke in said cylinder and comprising two spaced piston heads arranged to divide the cylinder into three compartments, a valve member shiftable by movement of said piston structure, means to connect the central compartment in said cylinder with a source of fluid, means forming a bleed line from each of the end compartments of said cylinder, valve means to control fluid flow through said bleed lines, said piston heads each having restricted flow passages therethrough to provide fluid passage from said central chamber of said cylinder to the outer of said chambers, respectively, the openings of said passages on the outer faces of said piston heads being appreciably larger in area than the area of the opening at the inner faces thereof, a valve member carried by the respective piston heads on the outer sides thereof and arranged to close on the larger ends of said openings of the passage through the respective piston heads, and means forming a stop adjacent to each end of said cylinder for limiting movement of said valve members toward the respective ends of said cylinder whereby said piston heads are urged against the respective valve members to close the passages therethrough as said piston heads approach the ends of their strokes adjacent to the ends of said cylinder.

3. A valve mechanism comprising in combination, a cylinder closed at opposite ends by end walls, a double head piston structure reciprocable through a given stroke in said cylinder and comprising two spaced piston heads arranged to divide the cylinder into three compartments, a valve member shiftable by movement of said piston structure, means to connect the central compartment in said cylinder with a source of fluid, means forming a bleed line from each of the end compartments of said cylinder, valve means to control fluid flow through said bleed lines, said piston heads each having restricted flow passages therethrough to provide fluid passage from said central chamber of said cylinder to the outer of said chambers, respectively, the openings of said passages on the outer faces of said piston heads being of appreciably larger diameter than the diameters of the openings at the inner faces thereof and a valve member carried by the respective piston heads on the outer sides thereof and arranged to close on the larger ends of said openings of the passage through the respective piston heads, said valve members each having a part engaging the adjacent end wall of said cylinder for limiting movement of the respective valve members toward the adjacent end walls of said cylinder whereby said piston heads are urged against the respective valve members to close the passages therethrough as said piston heads approach the ends of their strokes adjacent to the end walls of said cylinder.

4. A valve mechanism comprising in combination, a cylinder, a double head piston structure reciprocable through a given stroke in said cylinder and comprising two spaced piston heads arranged to divide the cylinder into three compartments, a valve member shiftable by movement of said piston structure, means to connect the central compartment in said cylinder with a source of fluid, means forming a bleed line from each of the end compartments of said cylinder, valve means to control fluid flow through said bleed lines, said piston heads each having restricted flow passages therethrough to provide fluid passage from said central chamber of said cylinder to the outer of said chambers, respectively, the openings of said passages on the outer faces of said piston heads being appreciably larger in area than the area of the opening at the inner faces thereof, a valve member carried by the respective piston heads on the outer sides thereof and arranged to close on the larger ends of said openings of the passage through the respective piston heads, said valve members each having a stem projecting into the respective flow passages to close a major portion of the cross-sectional area thereof and a reduced portion at the opposite end, a support structure for said valve members on each piston head having an opening through which said reduced portions extend to thereby guide said valve members for axial movement relative to the piston head on which said members are carried, and means forming a stop adjacent to each end of said cylinder which are engaged by the reduced portions of said valve members for limiting movement of said valve members toward the respective ends of said cylinder whereby said piston heads are urged against the respective valve members to close the passages therethrough as said piston heads approach the ends of their strokes adjacent to the ends of said cylinder.

5. In a valve mechanism, a cylinder having a closed end, a piston in said cylinder comprising a first plate having an outer side facing the closed end of said cylinder, said plate having a passage therethrough and a valve seat formed by the edges of said passage opening in the outer face of said plate, a valve member for closing on said seat, means to carry said valve member so as to have a limited free movement relative to said plate, said valve member being engageable with the closed end of said cylinder to restrain movement thereof relative to said piston, a seal member abutting the inner face of said plate and having the peripheral portion thereof lying against the walls of said cylinder, a second plate urging said seal against said first plate, said seal and second plate having openings aligned with the passage through said first plate, and plate joining members interconnecting said plates and projecting through openings through said seal member.

6. In a valve mechanism, a cylinder having a closed end, a piston in said cylinder comprising a first plate having an outer side facing the closed end of said cylinder, said plate having a passage therethrough and a valve seat formed thereon about said passage at the opening in said outer side, a valve member for closing on said seat, means attached to said piston for carrying said valve member in alignment with said valve seat and so as to have a limited free movement relative to said plate, said valve member being engageable with the closed end of said cylinder at one end of the stroke of said piston to restrain movement thereof relative to said piston, a seal member abutting the inner face of said plate and having the peripheral portion thereof lying against the walls of said cylinder, a second plate urging said seal against said first plate, said seal and second plate having openings aligned with the passage through said first plate, and plate joining members interconnecting said plates and projecting through openings through said seal member.

7. A valve mechanism comprising in combination, a cylinder, a double headed piston structure reciprocable through a given stroke in said cylinder and comprising two spaced piston heads arranged to divide the cylinder into three compartments, a valve member shiftable by movement of said piston structure, means to connect the central compartment in said cylinder with a source of relatively high pressure fluid, means forming a bleed line from each end of the outer compartments of said cylinder to a low pressure area, valve means to control fluid flow through one or the other of said bleed lines to thereby create a pressure on the outer face of one or the other of said piston heads lower than the pressure on the inner faces and thereby cause said piston structure to be urged into the chamber connected to exhaust, each of said piston heads having a fluid passage therethrough, a valve seat formed about each passage and providing a relatively large diameter opening in the respective passages, means forming a relatively restricted flow area in each of said fluid passages, two valve closure members engageable with said valve seats, respectively, to close and open the respective passages, and means forming an abutment at each end of said cylinder to limit movement of said valve members toward the outer ends of said cylinder to thereby cause each piston head to press the valve seat of the fluid passage therein against the respective valve members when said piston structure is driven to opposite ends of its stroke.

8. A valve mechanism comprising the combination set forth in claim 7 in which said means forming the relatively restricted flow areas in said passages comprise stem portions on said valve members projecting into said passages.

9. A valve mechanism comprising combination set forth in claim 7 in which said valve seats of said passages are at the outer ends of said piston heads and said valve members include stem portions projecting into said passages.

References Cited in the file of this patent
UNITED STATES PATENTS

| 1,647,189 | Mueller | Nov. 1, 1927 |
| 2,616,449 | Maha | Nov. 4, 1952 |
| 2,891,760 | Dewar | June 23, 1959 |